(12) United States Patent
Chakraborty et al.

(10) Patent No.: US 10,949,742 B2
(45) Date of Patent: Mar. 16, 2021

(54) ANONYMIZED TIME-SERIES GENERATION FROM RECURRENT NEURAL NETWORKS

(71) Applicant: International Business Machines Corporation, Armonk, NY (US)

(72) Inventors: Supriyo Chakraborty, White Plains, NY (US); Mudhakar Srivatsa, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 850 days.

(21) Appl. No.: 15/706,809

(22) Filed: Sep. 18, 2017

(65) Prior Publication Data

US 2019/0087720 A1 Mar. 21, 2019

(51) Int. Cl.
*G06N 3/08* (2006.01)
*G06N 3/10* (2006.01)
*G06N 3/04* (2006.01)

(52) U.S. Cl.
CPC ............... *G06N 3/08* (2013.01); *G06N 3/049* (2013.01); *G06N 3/0445* (2013.01); *G06N 3/084* (2013.01); *G06N 3/10* (2013.01)

(58) Field of Classification Search
None
See application file for complete search history.

(56) References Cited

U.S. PATENT DOCUMENTS

| 7,321,882 | B2 | 1/2008 | Jaeger | |
|---|---|---|---|---|
| 9,537,831 | B2 * | 1/2017 | Sedayao | ............ H04L 63/0421 |
| 9,836,623 | B2 * | 12/2017 | Carasso | .............. G06F 21/6254 |
| 2016/0099010 | A1 | 4/2016 | Sainath et al. | |
| 2016/0180215 | A1 | 6/2016 | Vinyals et al. | |
| 2016/0275947 | A1 | 9/2016 | Li et al. | |

FOREIGN PATENT DOCUMENTS

WO 2016156236 A1 10/2016

OTHER PUBLICATIONS

Cao et al, Differentially Private Real-time Data Release over Infinite Trajectory Streams (Year: 2015).*
Reinhardt et al, Averting the privacy risks of smart metering by local data preprocessing (Year: 2014).*
Sak et al., "Long Short-Term Memory Recurrent Neural Network Architectures for Large Scale Acoustic Modeling", Interspeech, 2014 (p. 339, col. 2, paras 1-3) http://193.6.4.39/~czap/letoltes/IS14/IS2014/PDF/AUTHOR/IS141304.PDF.

(Continued)

*Primary Examiner* — Li B. Zhen
*Assistant Examiner* — Mikayla Chubb
(74) *Attorney, Agent, or Firm* — Garg Law Firm, PLLC; Rakesh Garg; Joseph Petrokaitis

(57) ABSTRACT

An output time-series of a cell of a neural network is captured. A subset of a set of data points of the output time-series is consolidated into a singular data point. The singular data point is fitted in a data representation to form a quantified aggregated data point. The quantified aggregated data point is included in an intermediate time-series. Using the intermediate time-series as an input at an intermediate layer of the neural network, an anonymized output time-series is produced from the neural network.

20 Claims, 5 Drawing Sheets

(56) References Cited

OTHER PUBLICATIONS

Unknown; Unsupervised Feature Learning and Deep Learning Tutorial, http://ufldl.stanford.edu/tutorial/unsupervised/Autoencoders/, 2017.
Colah; Understanding LSTM Networks, http://colah.github.io/posts/2015-08-Understanding-LSTMs/, Aug. 27, 2015.

* cited by examiner

ANONYMIZED TIME-SERIES GENERATION FROM RECURRENT NEURAL NETWORKS

TECHNICAL FIELD

The present invention relates generally to a method, system, and computer program product for producing anonymized time-series. More particularly, the present invention relates to a method, system, and computer program product for anonymized time-series generation from recurrent neural networks.

BACKGROUND

Data emitted over a period by a data source is also called a time-series. In statistics, signal processing, and many other fields, a time-series is a sequence of data points, measured typically at successive times, spaced according to uniform time intervals, other periodicity, or other triggers. An input time-series is a time series that serves as input data. An output time series is a time-series that is data produced from some processing apparatus. A time-series may be an output time-series of one object and an input time-series of another object.

Time series forecasting is the use of a forecasting model to forecast future events based on known past events, to wit, to forecast future data points before they are measured. An example in econometrics is the opening price of a share of stock based on the stock's past performance, which uses time series forecasting analytics.

Time series data is not always uniformly distributed, and includes anomalies. Anomalies are non-uniformity of the distribution of an event in time series data. For example, if the data pertains to a golfing tournament, the events that occur in the tournament are reflected in the data. The type, spacing, peaking, repetition rate, intensity, duration, and other characteristics of the events are dependent on a variety of factors, and are therefore non-uniformly distributed in the data.

A time series is often not a simple case of single-event data. In other words, several factors participate independently or in a dependent manner, subject to a variety of influences, to affect a tracked event, and produce a data point in the time series. Thus, a time series based on which a forecast is to be created is hardly ever representable as a clean waveform of a fixed frequency. Instead, most time series which form inputs to forecasting models are a noisy combination of many waveforms of a variety of frequencies, harmonics, periodicities, seasonality, and anomalies.

Hereinafter, a reference to "data" in the context of an embodiment is a reference to one or more data points in a time-series, unless the reference is in a different context or is expressly distinguished where used.

The illustrative embodiments recognize that while anonymization methods for discrete data are quite readily available, anonymization of time-series is a quite different and significantly more challenging problem. Presently available anonymizers simply operate to remove, mask, or destroy identifying information in discrete data. However, the data points in a time-series typically have temporal dependencies on each other and other factors that influence the time-series. Simply removing or masking the identity of the data source from discrete data points of a time-series using an existing method of anonymization is insufficient to anonymize the time-series. The illustrative embodiments recognize that this insufficiency arises because the dependencies between the data points and the factors influencing the time-series can be used to overcome discrete data anonymization and can be used to reveal the identity of the data source.

The illustrative embodiments recognize that anonymized time-series are useful in a variety of applications, such as in constructing and testing forecasting models, controlling non-identity-related factors of events and processes that produce time-series data, and in numerous other cases. A solution is needed that can produce an anonymized time-series in which the data points are not themselves the original data points of an original time-series but are derived therefrom, while being unusable to determine an identity of a source of the original time-series, and while exhibiting the same temporal characteristics and relationships as in the original time-series.

SUMMARY

The illustrative embodiments provide a method, system, and computer program product. An embodiment includes a method that captures, using a processor and a memory, an output time-series of a cell of a neural network. The embodiment consolidates a subset of a set of data points of the output time-series into a singular data point. The embodiment fits the singular data point in a data representation, to form a quantified aggregated data point. The embodiment produces from the neural network, using an intermediate time-series as an input at an intermediate layer of the neural network, an anonymized output time-series, the intermediate time-series comprising the quantified aggregated data point. Thus, the embodiment produces an anonymized time-series in which the data points are not themselves the original data points of an original time-series but are derived therefrom, while being unusable to determine an identity of a source of the original time-series, and while exhibiting the same temporal characteristics and relationships as in the original time-series.

Another embodiment further truncates a data of the singular data point to form the quantified aggregated data point. Thus, the embodiment provides one specific manner in which a step in the anonymization process can be performed.

Another embodiment further rounds a data of the singular data point to form the quantified aggregated data point. Thus, the embodiment provides another specific manner in which a step in the anonymization process can be performed.

Another embodiment further transforms a first type of data of the singular data point to a second type, to form the quantified aggregated data point. Thus, the embodiment provides another specific manner in which a step in the anonymization process can be performed.

Another embodiment further selects a time window starting at a first starting time in the output time-series, wherein the subset of data points occurs in the time window. The embodiment slides the time window to a second starting time in the output time-series to consolidate a second subset of the set of data points of the output time-series. Thus, the embodiment provides one specific manner in which the consolidation step in the anonymization process can be performed.

Another embodiment further adds noise to a data point in the output time-series, wherein the noise comprises masking a portion of data in the data point in the output time-series. Thus, the embodiment provides one specific manner in which a step in the anonymization process can be performed.

Another embodiment further adds noise to a data point in the output time-series, wherein the noise comprises changing a portion of data in the data point in the output time-series. Thus, the embodiment provides another specific manner in which a step in the anonymization process can be performed.

Another embodiment further adds noise to a data point in the output time-series, wherein the noise comprises adding random data to a portion of data in the data point in the output time-series. Thus, the embodiment provides another specific manner in which a step in the anonymization process can be performed.

Another embodiment further provides an input time-series to the neural network, wherein a data point in the input time-series is usable to identify a data source of the input time-series. Thus, the embodiment is shown to generate an anonymized time-series from an input time-series in which data points can identify a data source.

In one embodiment, the cell is a Long Short-Term Memory (LSTM) cell, and the neural network is a Recurrent Neural Network (RNN). Thus, the embodiment provides one specific manner in which the neural network used in the anonymization process can be implemented.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
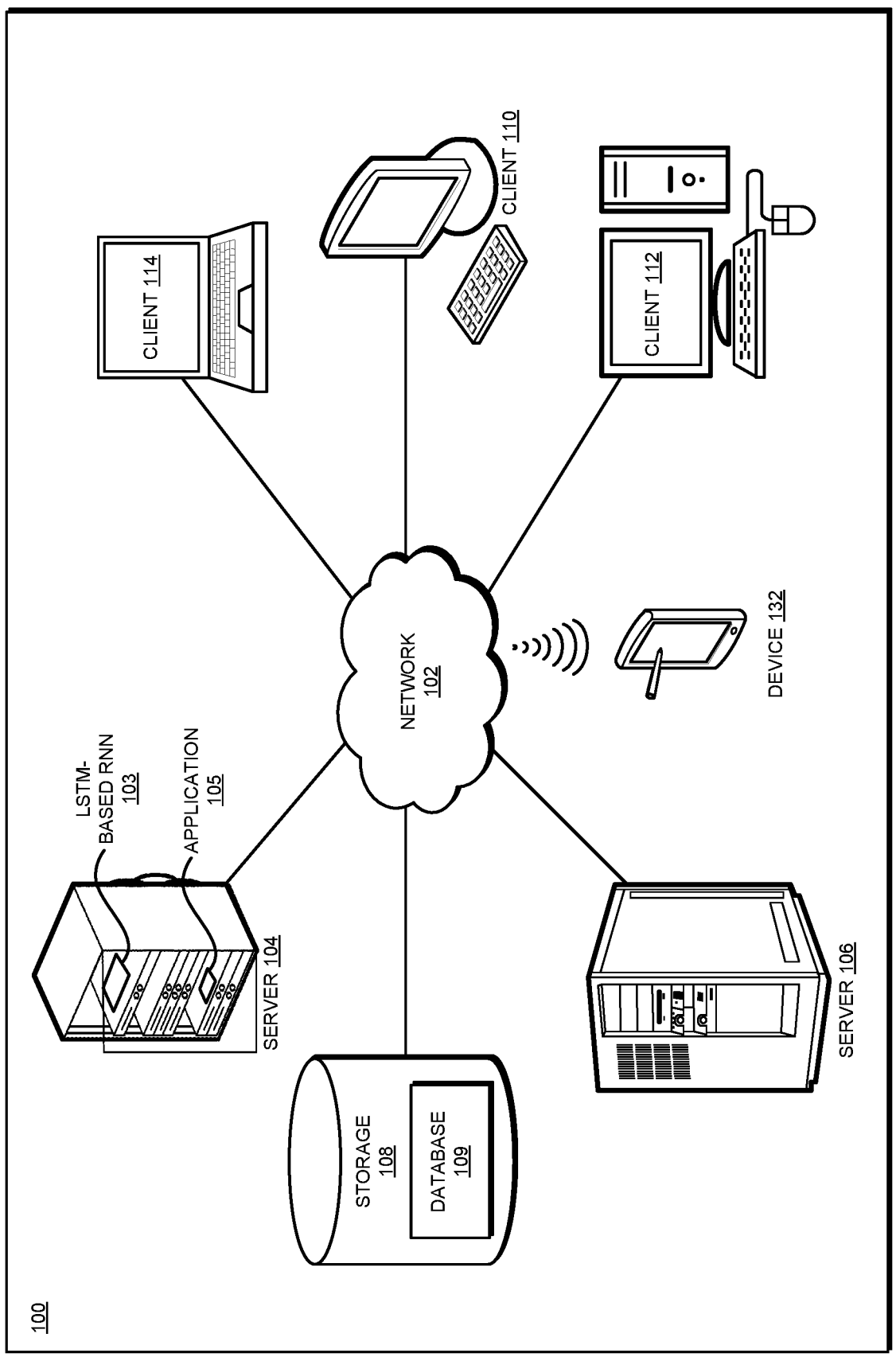
FIG. 1 depicts a block diagram of a network of data processing systems in which illustrative embodiments may be implemented.

The illustrative embodiments recognize that the presently available tools or solutions do not address these needs or provide adequate solutions for these needs. The illustrative embodiments used to describe the invention generally address and solve the above-described problems and other related problems by anonymized time-series generation from recurrent neural networks.

An embodiment can be implemented as a software application. The application implementing an embodiment, or one or more components thereof, can be configured as a modification of an existing Long Short-Term Memory (LSTM) type Recurrent Neural Network (RNN) implementation, as an application executing in a data processing system communicating with an existing RNN implementation over a local area network (LAN), as an application executing in a data processing system communicating with an existing RNN implementation over a wide area network (WAN), as a standalone application, or some combination thereof.

An Artificial Neural Network (ANN)—also referred to simply as a neural network—is a computing system made up of a number of simple, highly interconnected processing elements (nodes), which process information by their dynamic state response to external inputs. ANNs are processing devices (algorithms and/or hardware) that are loosely modeled after the neuronal structure of the mammalian cerebral cortex but on much smaller scales. A large ANN might have hundreds or thousands of processor units, whereas a mammalian brain has billions of neurons with a corresponding increase in magnitude of their overall interaction and emergent behavior.

Recurrent neural networks (RNN) are a type of artificial neural network designed to recognize patterns in sequences of data, such as text, genomes, handwriting, the spoken word, or numerical times series data emanating from sensors, stock markets and government agencies. RNNs use recurrent connections (going in the opposite direction that the "normal" signal flow) which form cycles in the network's topology. Computations derived from earlier input are fed back into the network, which gives an RNN something similar to a short-term memory. Feedback networks, such as RNNs, are dynamic; their 'state' is changing continuously until they reach an equilibrium point. For this reason, RNNs are particularly suited for detecting relationships across time in a given set of data. Natural Language Processing (NLP) and time-series forecasting are some fields of endeavor where RNNs are commonly used.

Recurrent networks take as their input not just the current input example they see, but also what they have perceived previously in time. The decision a recurrent net reached at time step t-1 affects the decision it will reach one moment later at time step t. Thus, recurrent networks have two sources of input, the present and the recent past, which combine to determine how they respond to new data.

RNNs suffer from an exploding gradient problem and a vanishing gradient problem. A gradient expresses the change in a weight with regard to the change in error. The weight is a weight value associated with a node in a neural network. If the gradient is not known, the weight cannot be adjusted in a direction that will decrease error, and the neural network ceases to learn. Recurrent nets seeking to establish connections between a final output and events many time steps before are problematic because it is very difficult to know how much importance to accord to remote inputs. Because the layers and time steps of neural networks relate to each other through multiplication, derivatives—such as gradients—are susceptible to vanishing or exploding. An exploding gradient treats a weight as highly important, causing that weight's gradient to become saturated on the high end, which in turn causes the associated node to become too powerful and dominant. Conversely, a vanishing gradient causes a weight to become too small to consider, leading to a weak node, which causes a failure of the neural network to learn.

LSTM is a gated cell configuration used in a neural network, such as in an RNN, to increase the span of short-term memory of a node and overcome the explosive and vanishing gradient problems in the RNN. LSTMs help preserve the error that can be backpropagated through time and layers. By maintaining a more constant error, they allow recurrent nets to continue to learn over many time steps. LSTMs contain information outside the normal flow of the recurrent network in a gated cell. Information can be stored in, written to, or read from a cell, much like data in a computer's memory. The cell makes decisions about what to store, and when to allow reads, writes and erasures, via gates that open and close.

An RNN is configured with LSTM cells. The RNN accepts as input a time-series from one or more data sources, and outputs a time-series that contains the temporal features and factors found in the one or more input time-series.

An embodiment inputs a time-series (I1) into the RNN. The embodiment splices the RNN. The splicing essentially disconnects a cell in one of the layers of the RNN such that the cell's output is not passed to another cell in the next layer of propagation without first passing through the embodiment. In other words, the embodiment receives the state, i.e., the time-series output (O1), of the cell, performs one or more operations described herein on the data points of the spliced output (O1) to form processed output (O2), and passes the processed output O2 as input (I2) to a cell in the next layer in the RNN. The embodiment outputs a final output time-series (O3) from the RNN.

In the processing between O1 and I2, one embodiment adds noise to the data points in time-series O1 as a step in the anonymization process. For example, if the data point is a five-digit postal code, the additional of the noise can be accomplished by hiding or masking the least significant digit. Generally, the noise can be added to a data point of a time-series by using an existing method of discrete data anonymization, such as by removing, masking, altering, or destroying some part of the data point. For example, random data can be added as noise to the data point.

The data points of O1 may be too close to each other in time as compared to a desired time interval (window). An embodiment aggregates or transforms the noisy data points appearing within a window into a single noisy data point for that window. For example, if the window sampling rate is one data point per second and the time-series data points occur at the rate of one every 1/10 seconds, the aggregation operation may aggregate the ten noisy data points falling within the window and take an average of the aggregated value. The average becomes the singular noisy data point representative of the time-series during the window.

This example manner of aggregation is not intended to be limiting. From this disclosure, those of ordinary skill in the art will be able to conceive many other ways in which to consolidate several data points of a time-series into a singular data point representative of the time-series during a given window, and the same are contemplated within the scope of the illustrative embodiments. For example, several data points in a window can be consolidated into one representative data point using a statistical method, such as a mean value or a weighted average, and many other methods.

One embodiment performs a quantification operation to transform or fit the singular consolidated noisy data point into a suitable representation that is desired at output O3. For example, suppose that an example desired anonymized time-series should have data points that are representable in 16 bits. Further suppose that the original data points of an input time-series I1, an aggregated noisy data point after O1 and before I2, or both, are represented using 32 bits. The quantification operation transforms or fits the 32-bit data item into a 16-bit representation. Generally, the quantification operation performs the fitting by rounding up, rounding down, truncating, translating, transcribing, summarizing, or by performing other more substantive operations.

The example quantification into a suitable representation is also not intended to be limiting. From this disclosure, those of ordinary skill in the art will be able to conceive many other representation-based transformations and the same are contemplated within the scope of the illustrative embodiments. For example, decimal data can be transformed into whole numbers, audio data can be transformed into textual data, unstructured data can be transformed into structured data, and so on, in this quantization operation, and the these and other similarly purposed quantization operations are usable with an embodiment without departing the scope of the illustrative embodiments.

An embodiment constructs the quantized aggregated noisy data points of O2 in this manner. The embodiment sends O2 to a cell in the next layer of the RNN as I2. The remaining layers of the RNN operate on I2 and produce output timeline O3. O3 contains data points that are anonymized in a manner contemplated by the illustrative embodiments. The data points of output time-series O3 are disconnected from the data points of the input time-series I1 to the extent that a data point in O3 is unusable for revealing an identity of a data source of I1, yet, the data points in O3 maintain the temporal, factual, and factors relationship in the manner of the data points of I1.

The manner of anonymized time-series generation from recurrent neural networks described herein is unavailable in the presently available methods. A method of an embodiment described herein, when implemented to execute on a device or data processing system, comprises substantial advancement of the functionality of that device or data processing system in producing an anonymized time-series that is unusable for revealing an identity of a data source of an original time-series while maintaining the temporal, factual, and factors relationship in the manner of the original time series.

The illustrative embodiments are described with respect to certain types of time-series, neural networks, cells, noise types, aggregation methods, quantification operations, time-series sources, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefore, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
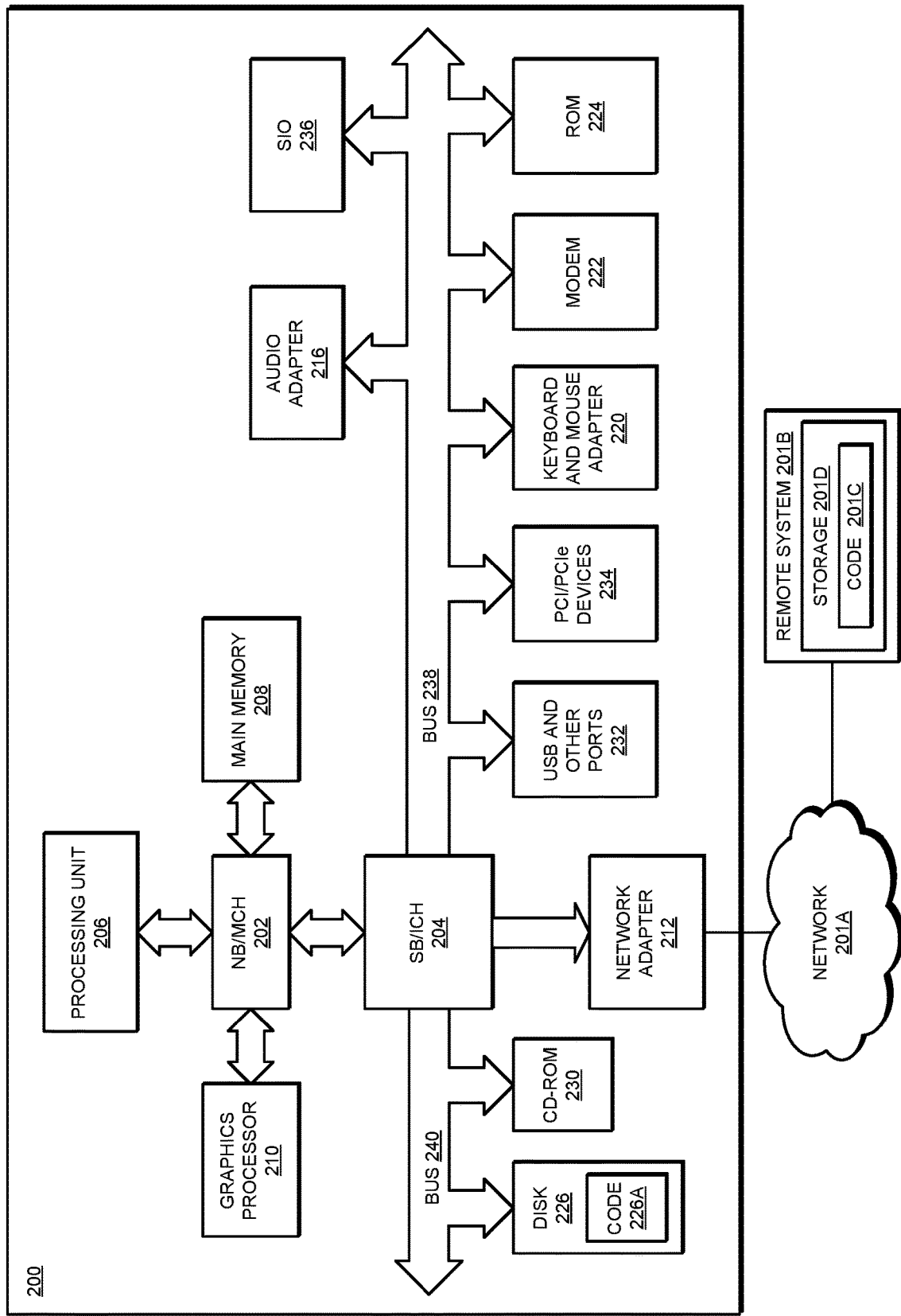
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

LSTM-based RNN 103 is a non-limiting example of a neural network that is usable with an embodiment described herein. Generally, any neural network that is configured to output a time-series can be used with a suitable adaptation of an embodiment described herein without limitation. Application 105 implements an embodiment relative to example RNN 103, as described herein.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
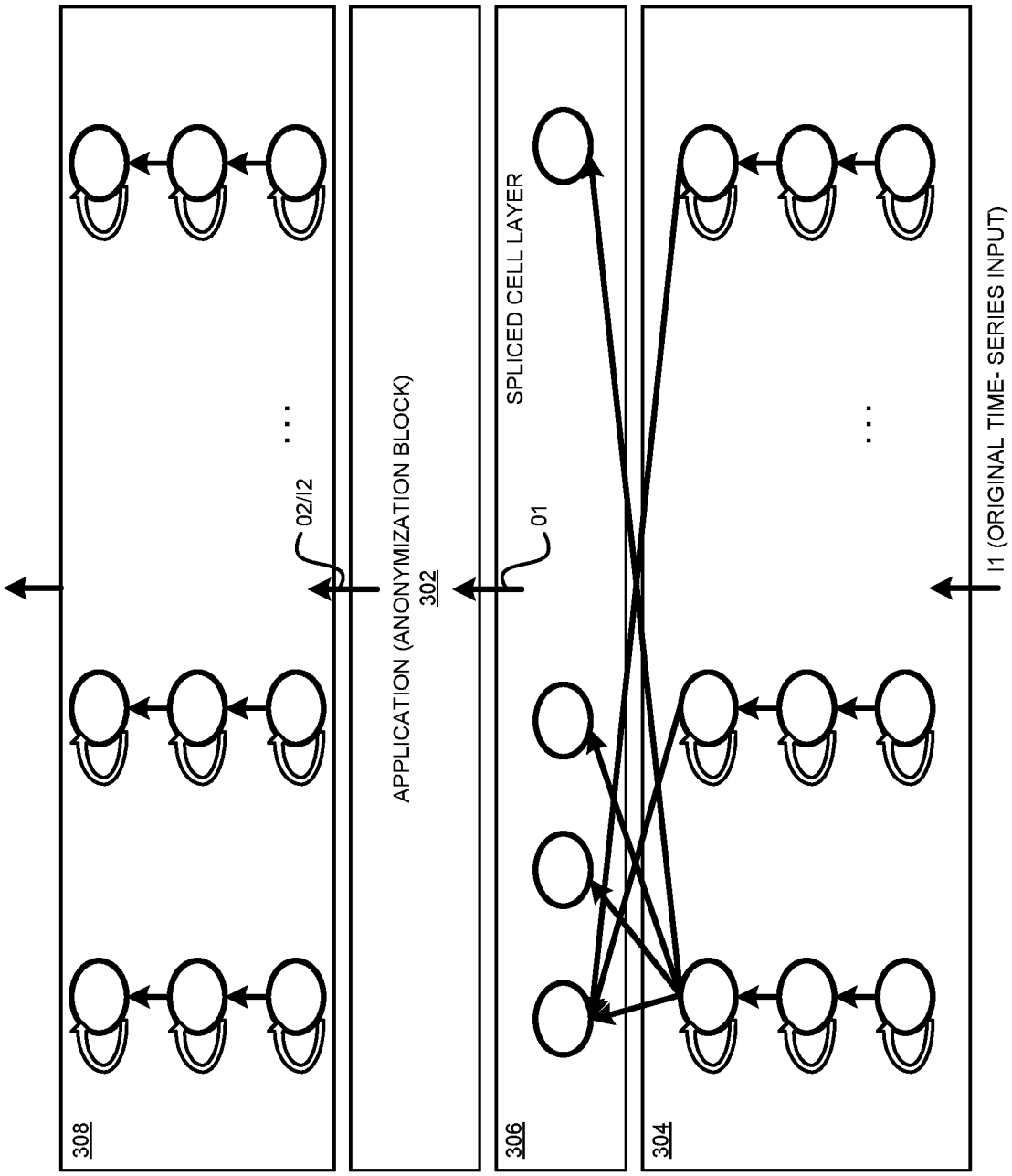
FIG. 3 depicts a block diagram of an example schematic for anonymized time-series generation from recurrent neural networks in accordance with an illustrative embodiment.

With reference to FIG. 3, this figure depicts a block diagram of an example schematic for anonymized time-series generation from recurrent neural networks in accordance with an illustrative embodiment. Application 302 is an example of application 105 in FIG. 1. An LSTM-based neural network, e.g., RNN 103 in FIG. 1, operates in conjunction with application 302 as shown. One or more layers of the neural network form each of layers 304, layer 306, and layers 308. Layer 306 comprises one or more cells that are spliced as described herein.

A data source (not shown), provides input time-series I1 to layers 304. Spliced cell layer 306 outputs an intermediate time-series output O1, which forms an input to application 302. Application 302 processes the time-series O1 and produces output O2, which forms input I2 to layers 308. Layers 308 produce anonymized output time-series O3.

Figure 4:
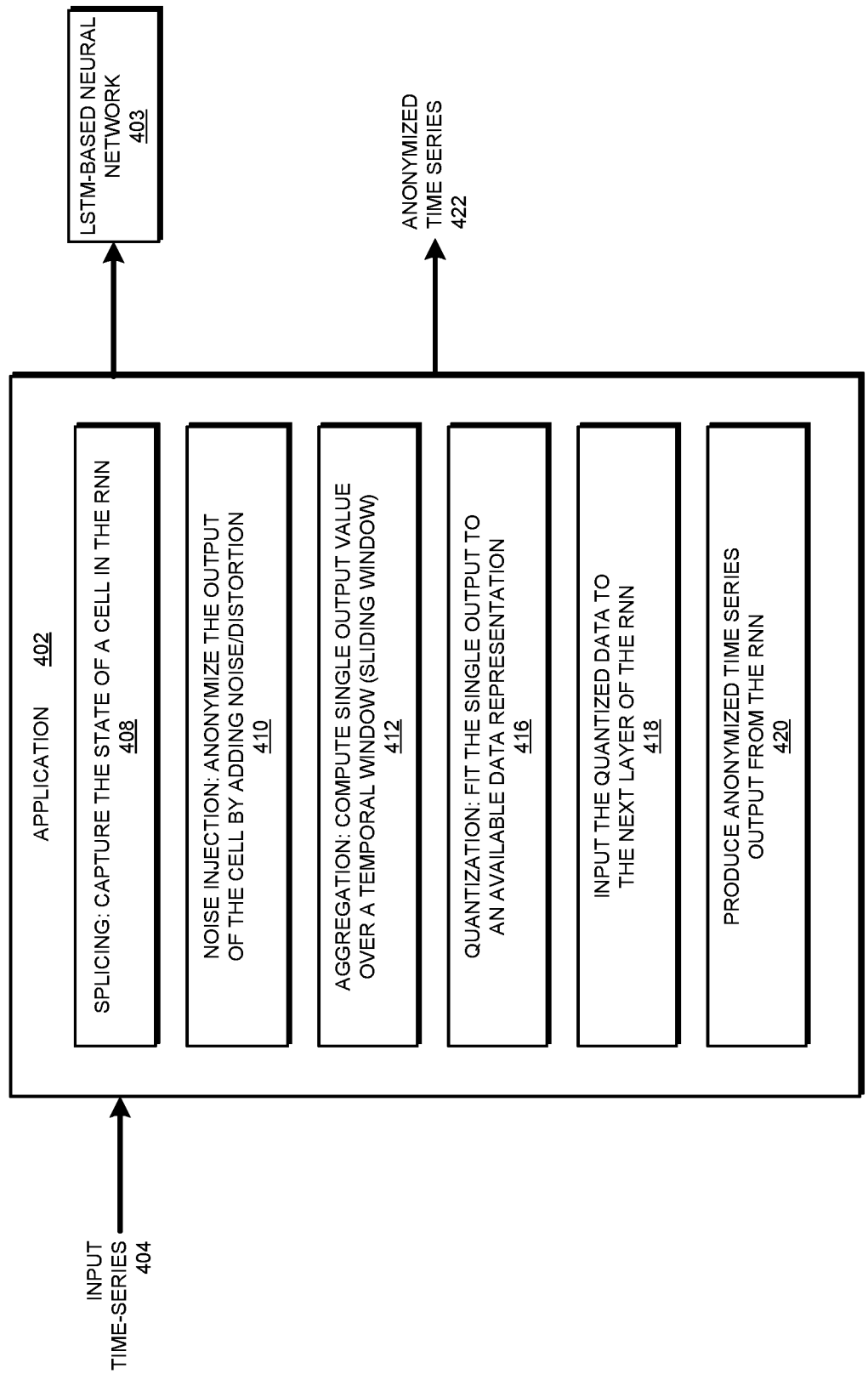
FIG. 4 depicts a block diagram of an example configuration for anonymized time-series generation from recurrent neural networks in accordance with an illustrative embodiment.

With reference to FIG. 4, this figure depicts a block diagram of an example configuration for anonymized time-series generation from recurrent neural networks in accordance with an illustrative embodiment. Application 402 is an example of application 302 in FIG. 3. LSTM-based neural network 403 is an example of the neural network having layers 304, 306, and 308 in the manner of FIG. 3.

Application receives, provides, or detects input time-series 404 for neural network 403. Component 408 splices into neural network 403 by capturing the state of a cell in a layer in neural network 403. Component 410 anonymizes the output of the spliced cell by injecting noise in the data points output from the cell.

Component 412 performs the aggregation operation to create a single output data point for a time window. The time window is a sliding window over the time-series output from the spliced cell.

Component 416 performs the quantization operation as described herein, to fit the single output per window into an available data representation. Component 418 inputs the quantized aggregated time-series into the next layer of the RNN. Component 420 produces anonymized time-series 422.

Figure 5:
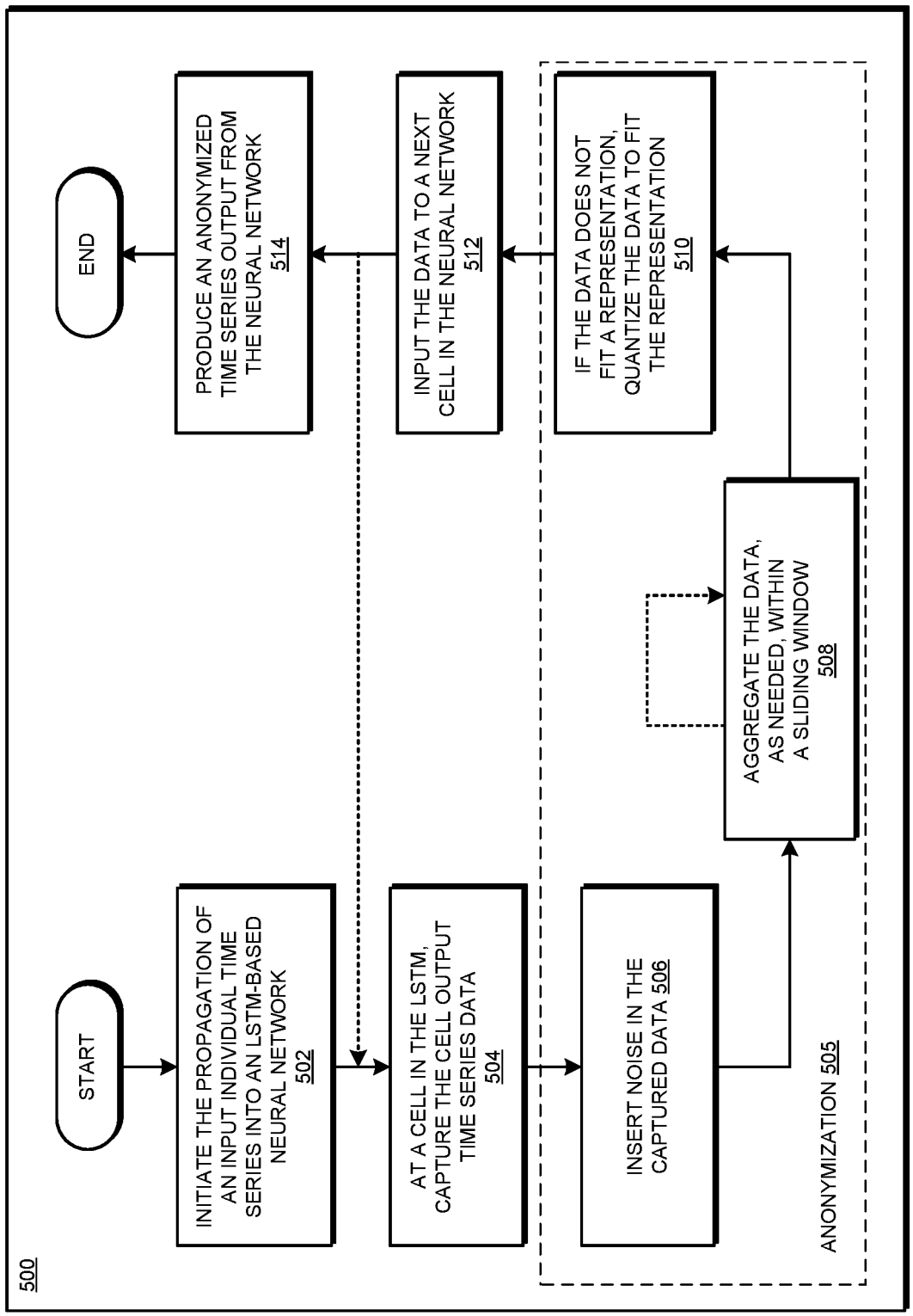
FIG. 5 depicts a flowchart of an example process for anonymized time-series generation from recurrent neural networks in accordance with an illustrative embodiment.

With reference to FIG. 5, this figure depicts a flowchart of an example process for anonymized time-series generation from recurrent neural networks in accordance with an illustrative embodiment. Process 500 can be implemented in application 402 inn FIG. 4.

The application initiates the propagation of an input time-series into an LSTM-based neural network (block 502). At a cell in the LSTM, the application captures the cell output time-series data points (block 504).

The application anonymizes the captured data (block 505), which include blocks 506, 508, and 510. To perform the anonymization, the application inserts noise in the captured data (block 506). The application aggregates the data as needed over a sliding window (block 508). The aggregation operation repeats for as many windows of time over which the aggregation may have to occur in the captured data points. If an aggregated data point does not fit a desired representation, the application quantifies the data point to fit the desired representation (block 510).

The application inputs the quantified aggregated data points as the input time-series to the next cell or layer after the spliced cell (block 512). Blocks 504-512 repeat as long as the input time-series of block 502 remains available.

The application produces, or causes the LSTM-enabled neural network to produce an anonymized time-series from the neural network (block 514). The application ends process 500 thereafter.

Thus, a computer implemented method, system or apparatus, and computer program product are provided in the illustrative embodiments for anonymized time-series generation from recurrent neural networks and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, including but not limited to computer-readable storage devices as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
capturing, using a processor and a memory, an output time-series of a cell of a neural network;
consolidating a subset of a set of data points of the output time-series into a singular data point;
fitting the singular data point in a data representation, to form a quantified aggregated data point; and
producing from the neural network, using an intermediate time-series as an input at an intermediate layer of the neural network, an anonymized output time-series, the intermediate time-series comprising the quantified aggregated data point.

2. The method of claim 1, further comprising:
truncating a data of the singular data point to form the quantified aggregated data point.

3. The method of claim 1, further comprising:
rounding a data of the singular data point to form the quantified aggregated data point.

4. The method of claim 1, further comprising:
transforming a first type of data of the singular data point to a second type, to form the quantified aggregated data point.

5. The method of claim 1, further comprising:
selecting a time window starting at a first starting time in the output time-series, wherein the subset of data points occurs in the time window; and
sliding the time window to a second starting time in the output time-series to consolidate a second subset of the set of data points of the output time-series.

6. The method of claim 1, further comprising:
adding noise to a data point in the output time-series, wherein the noise comprises masking a portion of data in the data point in the output time-series.

7. The method of claim 1, further comprising: adding noise to a data point in the output time-series, wherein the noise comprises changing a portion of data in the data point in the output time-series.

8. The method of claim 1, further comprising:
adding noise to a data point in the output time-series, wherein the noise comprises adding random data to a portion of data in the data point in the output time-series.

9. The method of claim 1, further comprising:
providing an input time-series to the neural network, wherein a data point in the input time-series is usable to identify a data source of the input time-series.

10. The method of claim 1, wherein the cell is a Long Short-Term Memory (LSTM) cell, and the neural network is a Recurrent Neural Network (RNN).

11. A computer usable program product comprising one or more computer-readable storage devices, and program instructions stored on at least one of the one or more storage devices, the stored program instructions comprising:
program instructions to capture, using a processor and a memory, an output time-series of a cell of a neural network;
program instructions to consolidate a subset of a set of data points of the output time-series into a singular data point;
program instructions to fit the singular data point in a data representation, to form a quantified aggregated data point; and
program instructions to produce from the neural network, using an intermediate time-series as an input at an intermediate layer of the neural network, an anonymized output time-series, the intermediate time-series comprising the quantified aggregated data point.

12. The computer usable program product of claim 11, further comprising:
program instructions to truncate a data of the singular data point to form the quantified aggregated data point.

13. The computer usable program product of claim 11, further comprising:
program instructions to round a data of the singular data point to form the quantified aggregated data point.

14. The computer usable program product of claim 11, further comprising:
program instructions to transform a first type of data of the singular data point to a second type, to form the quantified aggregated data point.

15. The computer usable program product of claim 11, further comprising:
program instructions to select a time window starting at a first starting time in the output time-series, wherein the subset of data points occurs in the time window; and
program instructions to slide the time window to a second starting time in the output time-series to consolidate a second subset of the set of data points of the output time-series.

16. The computer usable program product of claim 11, further comprising:
program instructions to add noise to a data point in the output time-series, wherein the noise comprises masking a portion of data in the data point in the output time-series.

17. The computer usable program product of claim 11, further comprising: adding noise to a data point in the output time-series, wherein the noise comprises changing a portion of data in the data point in the output time-series.

18. The computer usable program product of claim 11, wherein the computer usable code is stored in a computer readable storage device in a data processing system, and wherein the computer usable code is transferred over a network from a remote data processing system.

19. The computer usable program product of claim 11, wherein the computer usable code is stored in a computer readable storage device in a server data processing system, and wherein the computer usable code is downloaded over a network to a remote data processing system for use in a computer readable storage device associated with the remote data processing system.

20. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
program instructions to capture an output time-series of a cell of a neural network;
program instructions to consolidate a subset of a set of data points of the output time-series into a singular data point;
program instructions to fit the singular data point in a data representation, to form a quantified aggregated data point; and
program instructions to produce from the neural network, using an intermediate time-series as an input at an intermediate layer of the neural network, an anonymized output time-series, the intermediate time-series comprising the quantified aggregated data point.

* * * * *